United States Patent [19]

Hayasaka

[11] Patent Number: 5,327,793
[45] Date of Patent: Jul. 12, 1994

[54] THRUST BEARINGS AND BEVEL GEARS ARRANGEMENT OF MARINE PROPULSION UNIT

[75] Inventor: Kenichi Hayasaka, Hamamatsu, Japan

[73] Assignee: Yamaha Hatsudoki Kabushiki Kaisha, Iwata, Japan

[21] Appl. No.: 63,372

[22] Filed: May 18, 1993

Related U.S. Application Data

[63] Continuation of Ser. No. 824,992, Jan. 24, 1992, abandoned, which is a continuation-in-part of Ser. No. 770,607, Oct. 3, 1991.

[30] Foreign Application Priority Data

Feb. 5, 1991 [JP] Japan .................... 3-35207

[51] Int. Cl.⁵ .................. B63H 21/28; F16H 3/14
[52] U.S. Cl. .................... 74/378; 74/423; 74/665 GB; 384/420
[58] Field of Search .......... 74/347, 378, 423, 665 GB, 74/DIG. 2, DIG. 8; 384/225, 420

[56] References Cited

U.S. PATENT DOCUMENTS

| | | |
|---|---|---|
| 1,875,487 | 9/1932 | Perkins .................... 74/423 |
| 1,946,439 | 2/1934 | Heller ..................... 384/420 |
| 2,972,902 | 2/1961 | Rockwell .................. 74/378 |
| 3,354,994 | 11/1967 | Sieving et al. ............ 74/378 |
| 4,630,719 | 12/1986 | McCormick ............... 74/378 X |
| 4,689,027 | 8/1987 | Harada et al. ............ 440/75 |
| 4,909,767 | 3/1990 | Hayasaka ................ 74/378 X |
| 4,986,774 | 1/1991 | Wantz ..................... 440/75 |

FOREIGN PATENT DOCUMENTS

812784  4/1959  United Kingdom ........... 74/DIG. 8

*Primary Examiner*—Leslie A. Braun
*Assistant Examiner*—Khoi Q. Ta
*Attorney, Agent, or Firm*—Knobbe, Martens, Olson & Bear

[57] ABSTRACT

A bevel gear transmission for a marine outboard drive having hydraulically actuated clutches for selectively coupling oppositely rotating bevel gears to a shaft to affect either forward or reverse drive. The bevel gears are each supported on the shaft by thrust bearings and are on the outer sides of the bevel gears and are urged into engagement with the thrust bearings by coil compression springs that also act to release the respective clutches. As a result of this arrangement, a constant lash is maintained between the bevel gears regardless of whether they are transmitting a driving thrust or not.

18 Claims, 7 Drawing Sheets

THRUST BEARINGS AND BEVEL GEARS ARRANGEMENT OF MARINE PROPULSION UNIT

CROSS-REFERENCE TO RELATED APPLICATION

This is a continuation of U.S. patent application Ser. No. 07/824,992, filed Jan. 24, 1992, now abandoned, which application is a continuation-in-part of my application entitled "Power Transmission System For An Inboard/Outboard Motor" Ser. No. 770,607, filed Oct. 3, 1991 and assigned to the Assignee hereof.

BACKGROUND OF THE INVENTION

This invention relates to a power transmission system of a marine propulsion unit and more particularly to an improved bevel gear transmission for such units.

It is well known to employ bevel gear transmission in marine outboard drives for transferring drive between two perpendicularly disposed shafts. Frequently, these drives include a reversing transmission that is comprised of a driving bevel gear on a first shaft and a pair of counter rotating driven bevel gears that are journalled on a second shaft and which may be selectively coupled for rotation therewith through a clutching mechanism. With respect to the counter rotating bevel gears, it has been the practice to position them axially upon the second shaft by means of a thrust bearing on one side and a thrust washer on the opposite side. However, such arrangements necessitate the use of a clearance in the system and this means that the bevel gears are not axially fixed upon their respective shaft. That is, the bevel gears may move axially along the shaft upon which they are rotatably journalled due to the clearances between the thrust bearing, thrust washer and the gear itself. Such arrangement are, of course, not completely satisfactory.

In the first instance, when the driven bevel gear is not clutched for rotation with the shaft it can move axially relative to the shaft under the action of the driving forces exerted on it by the intermeshing bevel gear. This axially movement of the bevel gear can give rise to noise. Furthermore, when the clutch is engaged, because the axially position of the bevel gear may move, additional noise, wear and possible other problems can result.

It is, therefore, a principal object to this invention to provide an improved power transmission system for a marine propulsion unit embodying bevel gears.

It is a further object to this invention to provide a bevel gear transmission for a marine outboard drive wherein the driven bevel gear is axially fixed relative to the shaft upon which it rotates under all conditions.

It is a further object to this invention to provide an improved arrangement for taking the lash out of the gear position of a bevel gear transmission.

In the type of transmission already described, it is common practice to employ a multiple disc clutch for clutching the counter rotating bevel gears to the shaft for establing a driving relation with the shaft. In my aforenoted co-pending application, this mechanism includes a hydraulic actuating piston for actuating the clutch. In addition, a spring is employed for releasing the clutch and moving the piston to its retracted position.

In accordance with a further feature of the invention, a clutch return spring is employed for also acting on the bevel gear associated with the clutch for holding the bevel gear against a thrust bearing so as to provide axial location for the bevel gear under all conditions.

SUMMARY OF THE INVENTION

This invention is adapted to be embodied in a bevel gear transmission for transmitting drive between a first shaft rotatable about a first axis and a second shaft rotatable about a second axis that extends generally perpendicularly to the first axis. A first bevel gear is on the first shaft and a second bevel gear is enmeshed with the first bevel gear and is on the second shaft. A thrust bearing is engaged with one side of the second bevel gear and spring means is engaged with the other side of the second bevel gear for urging the one side into engagement with the thrust bearing for axially positioning the second bevel gear on the second shaft.

DETAILED DESCRIPTION OF THE PREFERRED EMBODIMENT OF THE INVENTION

Figure 1:
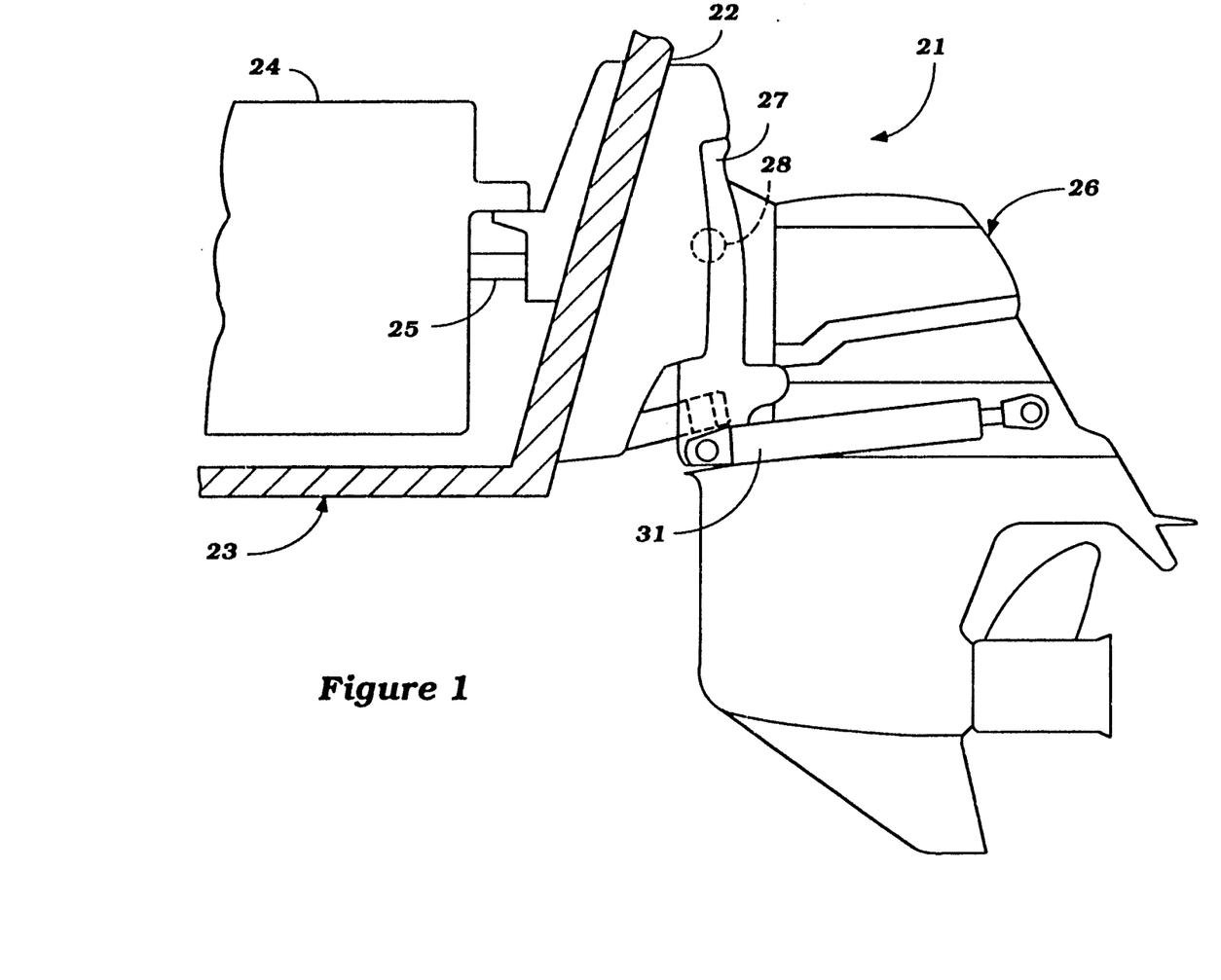
FIG. 1 is a side elevational view of a portion of an inboard/outboard drive as attached to the transom of a watercraft, shown partially and in cross section.

Referring first in detail to FIG. 1, an inboard/outboard marine propulsion unit constructed in accordance with an embodiment of the invention is identified generally by the reference numeral 21. The inboard/outboard drive 21 is adapted to be mounted on the transom 22 of a watercraft, the hull of which is shown in partial cross section and which is identified generally by the reference numeral 23.

The inboard/outboard drive 21 includes an inboard mounted internal combustion engine 24, which may of any known type and which is mounted forwardly of the transom 22 in a suitable manner. The engine 24 has its crankshaft connected via flywheel and elastic coupling to a front yoke 36 of a universal joint extending through the transom 22 for driving an outboard drive unit in an outer housing assembly.

The outer housing assembly 26 is mounted on a gimble ring 27 for tilt and trim movement about a horizontally extending axis by means of tilt pins 28 in a well-known manner. The gimble ring 27 is, in turn, mounted in a stern plate 29 for steering movement about a generally vertically extending steering axis. A hydraulic cylinder assembly 31 is interposed between the gimble ring 27 and outboard drive unit outer housing 26 for accommodating power tilt and trim movement.

Figure 2:
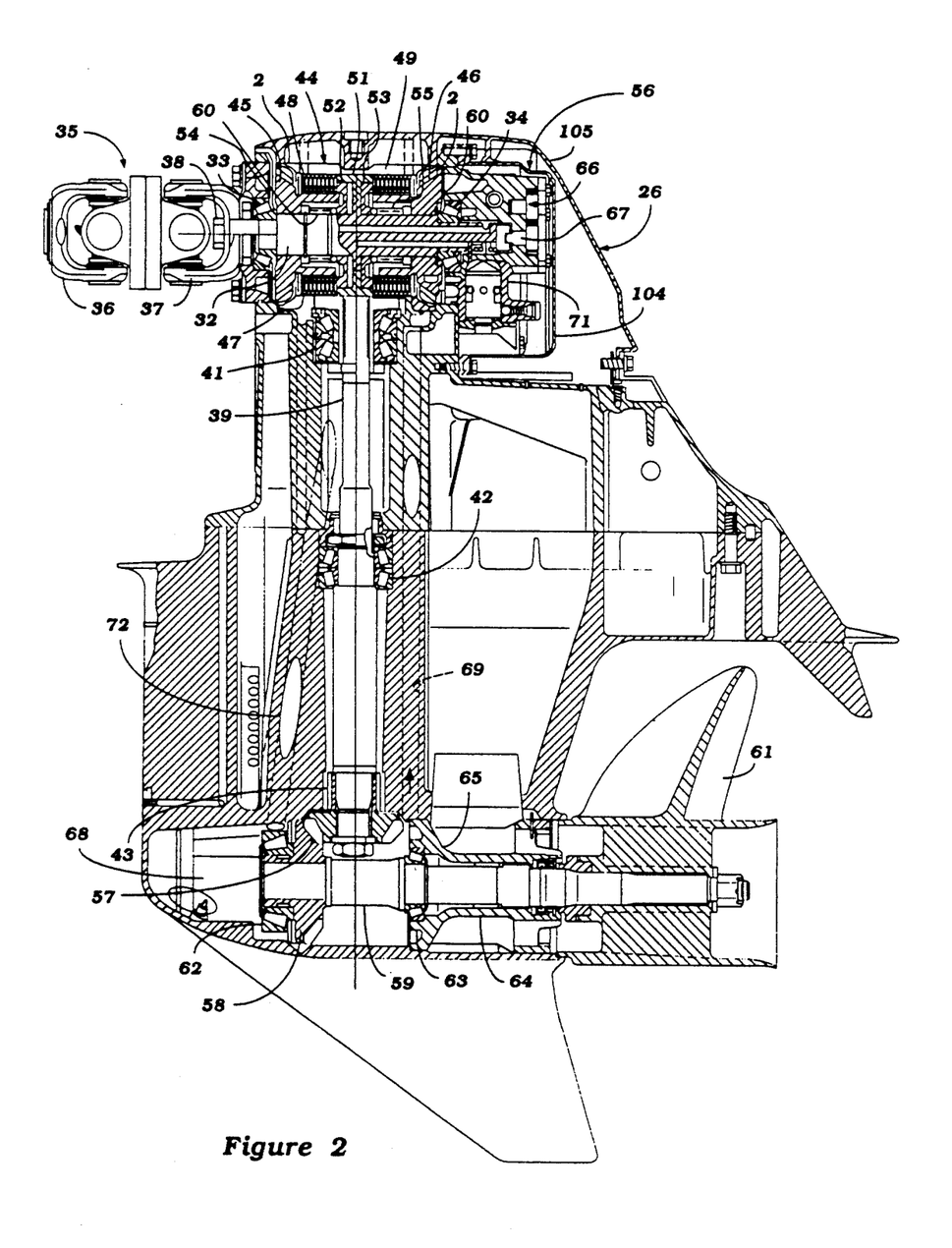
FIG. 2 is an enlarged cross sectional view taken along a vertically extending axis of the outboard drive.

Referring now in detail to FIG. 2, the outboard drive unit outer housing 26 is made up of n number of interconnected pieces and includes an upper portion in which an input shaft 32 is journalled by means of a front bearing 33 and a rear bearing 34 that are affixed in the housing assembly in a suitable manner. The universal joint assembly, indicated generally by the reference numeral 35 has the front yoke 36 which has a splined connection to a center boss of the erastic coupling (not shown), as by a splined connection and a rear yoke 37 which is affixed to the forward end of the input shaft 32 by means of a splined connection and threaded fasteners.

A generally vertically extending drive shaft 39 is journalled within the outer housing 26, at its upper portion by a thrust bearing 41, at its intermediate portion by a thrust bearing 42 and at its lower portion by a needle bearing 43. The axis of rotation of the drive shaft 39 generally intersects the horizontally extending rotational axis of the input shaft 32.

Figure 10:
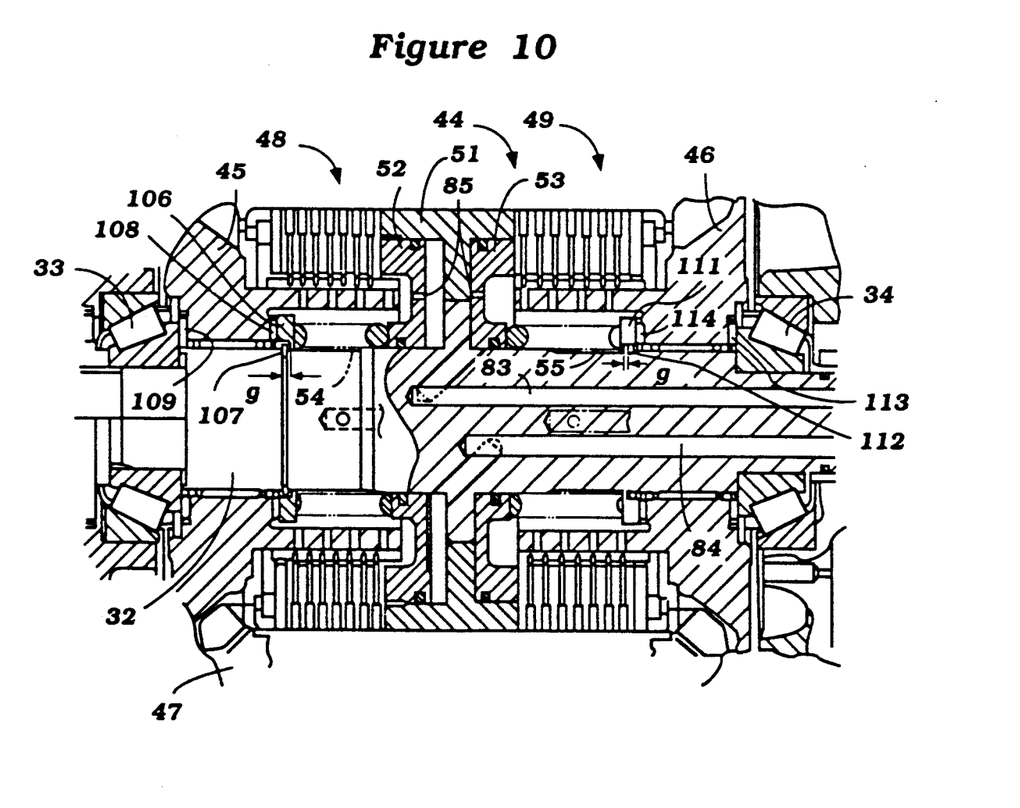
FIG. 10 is an enlarged cross sectional view of the clutching mechanism associated with the driven bevel gears.
Figure 11:
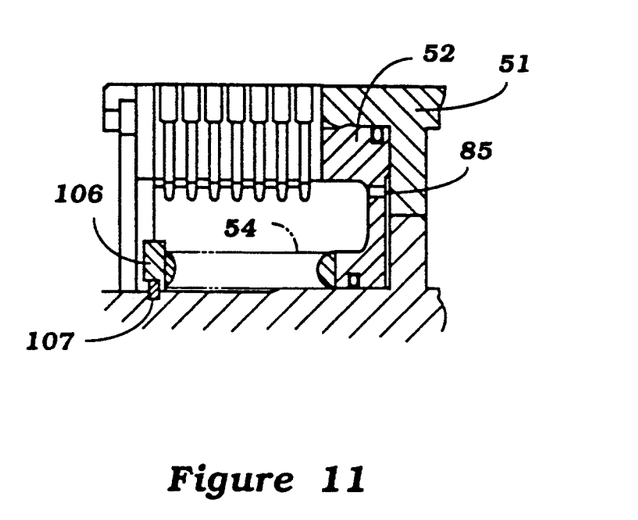
FIG. 11 is a further enlarged cross sectional view showing the return spring relationship with the actuating piston of one of the clutches and how it acts against the thrust washer and before installation in the complete transmission.

A forward, neutral and reverse transmission, indicated generally by the reference numeral 44 and shown also in more detail in FIGS. 10 and 11 is contained within the upper potion of the housing assembly 26 for selectively driving the drive shaft 39 from the input shaft 32 in selected forward and reverse directions. This transmission includes a pair of driving bevel gears 45 and 46 that are journalled for rotation on the input shaft 32 on opposite sides of and enmeshed with a driven bevel gear 47 that is affixed for rotation to the upper end of the drive shaft 39 in a known manner.

Forward and reverse multiple discs clutches 48 and 49 are provided for selectively coupling a clutch housing 51 that is affixed, as by welding to the input shaft 32, to the gears 45 and 46 respectively, so as to drive the drive shaft 39 in forward and reverse directions, as aforenoted. The clutches 48 and 49 have a first series of plates that are externally splined and have a splined connection with the clutch housing 51 so as to rotate with it. These driving clutch plates are interspersed with driven clutch plates that have an internal splined connection to hubs of the gears 45 and 46.

The clutch housing 51 defines a pair of oppositely facing bores in which forward and reverse clutch actuating pistons 52 and 53 are slideably supported. The pistons 52 and 53 are normally urged to a retracted position by means of respective release springs 54 and 55 that act between the gears 45 and 46 and the pistons 52 and 53, respectively, in a manner to be described. The pistons 52 and 53 are selectively pressurized, by means of a control assembly, indicated generally by the reference numeral 56 and which is mounted in the rear of the upper portion of the outer housing assembly 26 in a manner to be described.

The lower end of the drive shaft 39 has affixed to it a bevel gear 57 which is enmeshed with a bevel gear 58 fixed to a propulsion device, in the form of a propeller shaft 59 and propeller 61 that is affixed for rotation with the propeller shaft 59 in an appropriate manner. The propeller shaft 59 is journalled in the lower portion of the outer housing assembly 26 by a forward thrust bearing 62, a reverse thrust bearing 63 and a needle bearing 64. The bearings 63 and 64 are mounted within a bearing carrier 65 that is affixed to the lower end of the outer housing assembly 26 in a known manner.

The control assembly 56 includes a pressure pump 66 that is made up of a pair of intermeshing gears, one of which has a keyed connection 67 to the rear end of the input shaft 32 to be driven thereby. This gear pump 66 draws lubricant from a reservoir 68 formed in the lower portion of the housing assembly 26 around the gears 57 and 58 through a delivery passageway 69. The pressurized fluid is then delivered to a control valve assembly, indicated generally by the reference numeral 71 and which has a construction, as will be described. The pressurized lubricant is then delivered to various components of the system including the bevel gears 45 and 46, the bearings 41 and 42 and back to the reservoir 68 through a return passageway 72 for eventual recirculation. In addition, the control valve 71 can selectively pressurize either the piston 52 or the piston 53 for energizing or engaging either the clutch 48 or 49.

Figure 3:
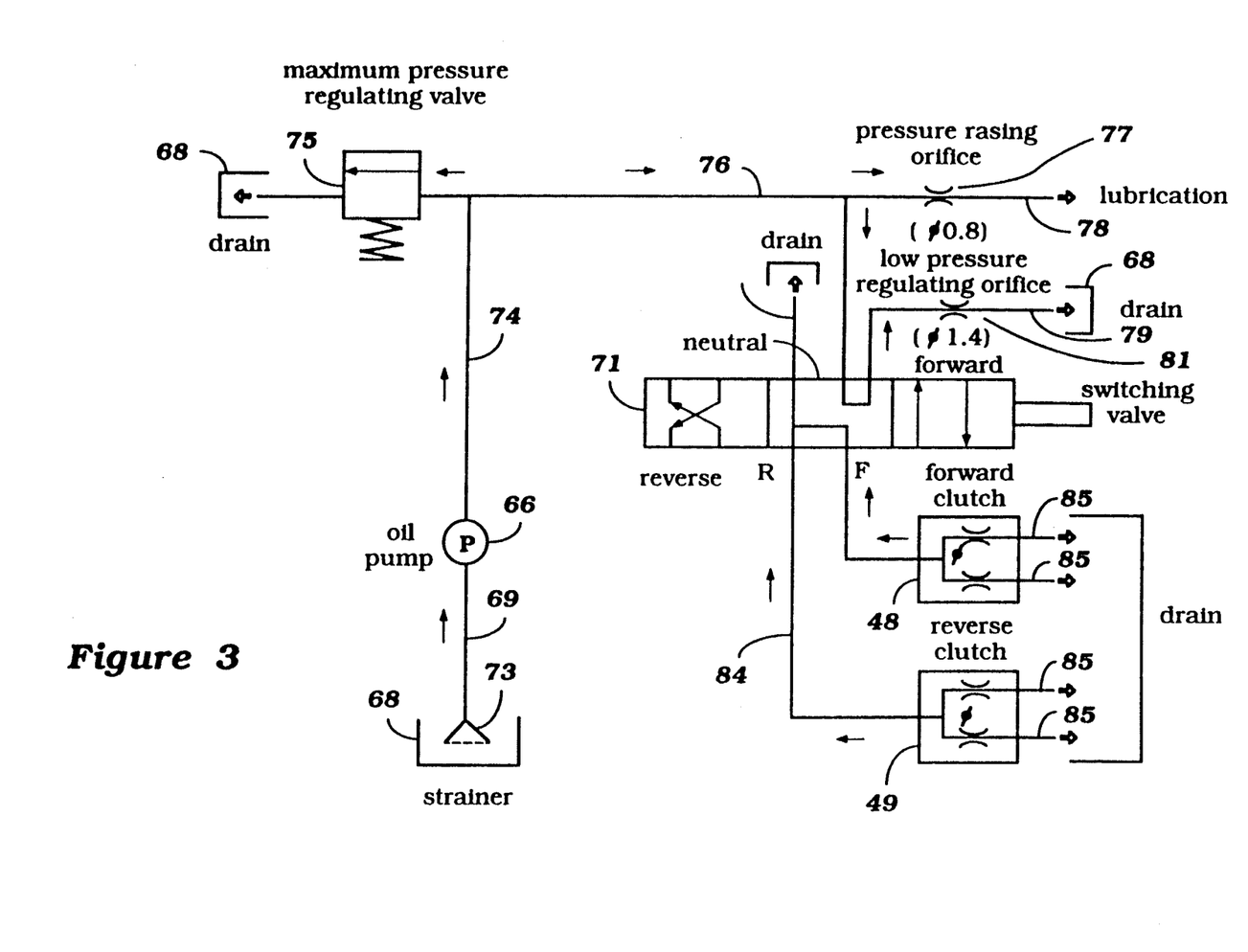
FIG. 3 is a schematic view of the hydraulic system for actuating the clutches of the transmission and lubricating the transmission and is shown in the neutral transmission condition.
Figure 4:
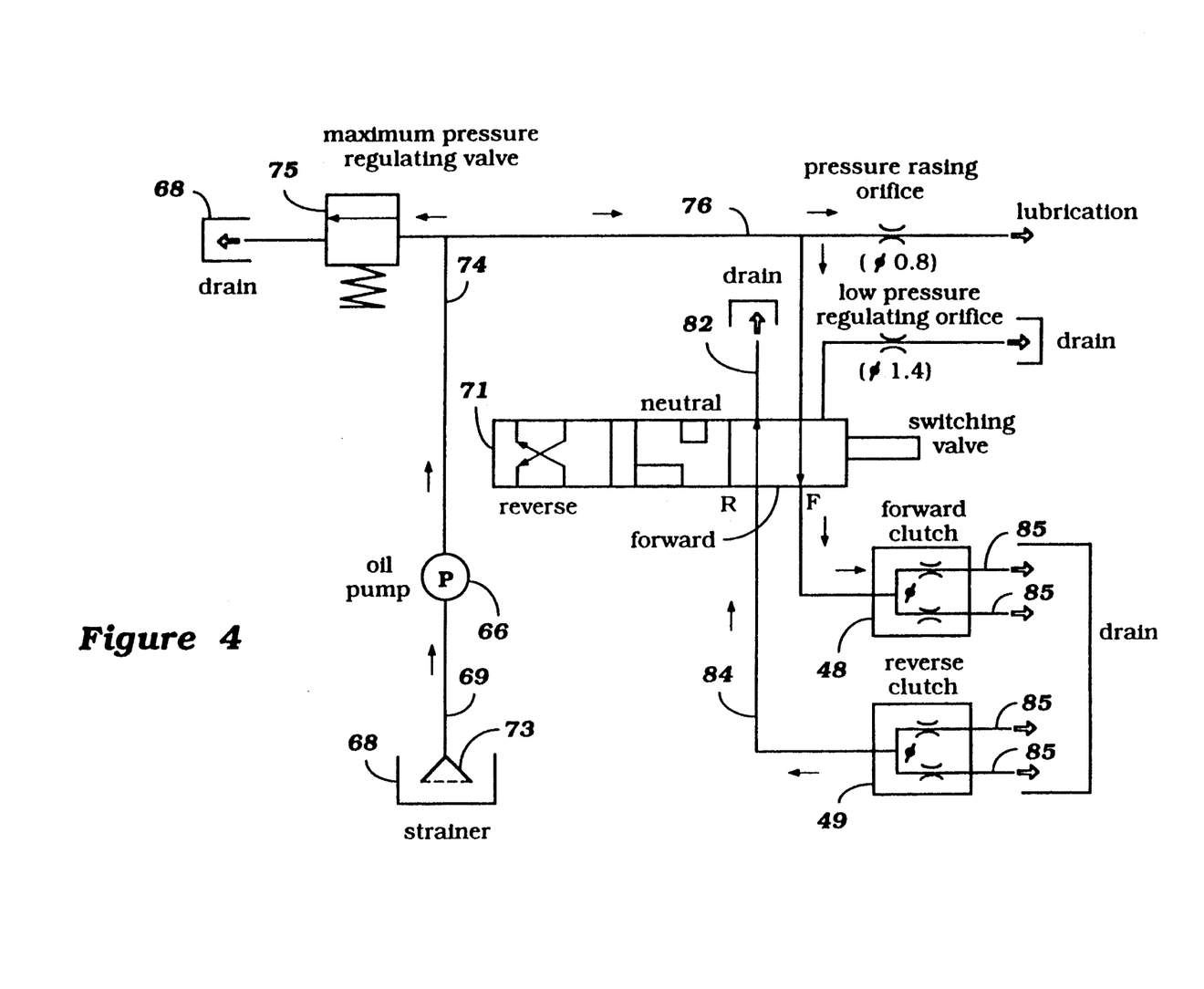
FIG. 4 is a schematic view, in part similar to FIG. 3, showing the condition in the forward drive mode.
Figure 5:
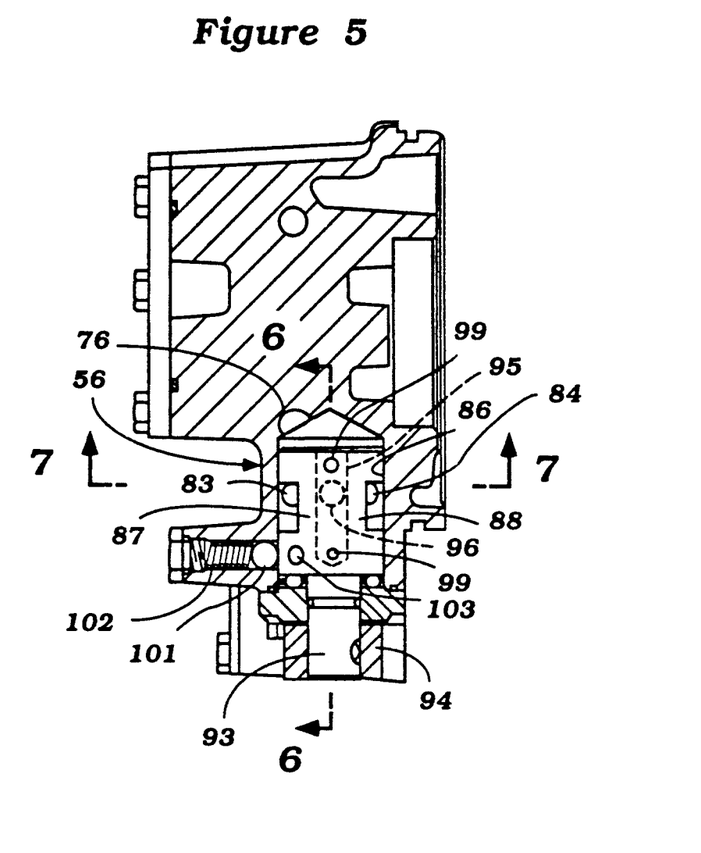
FIG. 5 is a cross sectional view showing the transmission control valve.
Figure 6:
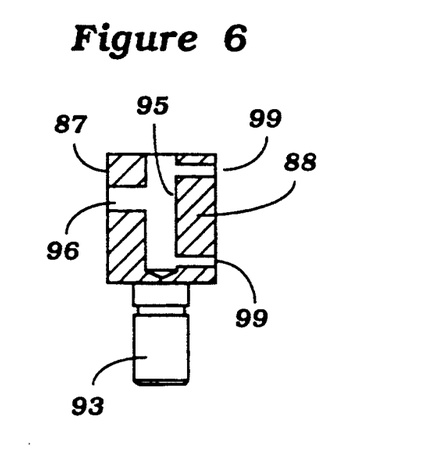
FIG. 6 is a cross sectional view taken along the line 6—6 of FIG. 5.

This system is shown best in FIGS. 3 and 4. As may be seen, a strainer or filter 73 may be provided at the inlet end of the passage 69 for filtering the lubricant and the lubricant is then delivered to a discharge conduit 74 in which a pressure regulating valve 75 is positioned. The regulating valve 75 limits the maximum hydraulic pressure in the system by dumping the excess fluid back to the lubricant cavity 68 through a suitable drain passageway.

In addition, the line 74 communicates with a line 76 in which a pressure reducing orifice 77 is positioned so as to reduce the pressure supplied to the lubrication system by appropriately sizing the orifice 77 without significantly reducing the pressure supplied for actuating the cluches 48 and 49. The orifice 77 then outputs its fluid to a line, shown schematically at 78, which delivers lubricant to the various components as aforenoted. These lubricant lines will be later on described. It should be noted that in the neutral position of the shift control valve 71, the pressure line 76 is communicated with a further drain line 79 in which an orifice 81 is provided so as to further control the pressure when no lubricant is being delivered to the clutches for their actuation.

The valve 71 selectively communicates either the pressure line 76 or a drain line 82 with either of conduits 83 and 84 which extend to the actuating pistons 52 and 53 of the forward and reverse clutches, respectively. The lines 83 and 84 may be conveniently formed by drilling through the interior of the input shaft 32 and intersecting the drilled passages with radial passages (FIG. 10). The axial outer ends of the drilled passages formed in the input shaft 32 are closed by blind plugs (not shown). The rear end of the input shaft is configured to form the keyed connection 67 to the rear end of the input shaft 32.

The clutch pistons 52 and 53 are also provided with restricted drain ports 85 (FIGS. 4, 10 and 11) so as to relieve all hydraulic pressure on the back side of the pistons 52 and 53 when they are released.

FIG. 4 shows the position when the transmission is shifted into forward condition by moving of the valve 71 so as to expose the forward clutch line 83 to the pressure line 76 and the reverse clutch line 84 to the drain line 82. When this occurs, the forward clutch 48 will be engaged and the reverse clutch 49 will be released and the propeller shaft 59 and propeller 61 will be driven in a forward drive position.

As should be readily apparent, when the transmission is shifted into reverse, the reverse clutch line 84 is communicated with the pressure line 76 and the forward clutch line 83 is communicated with the drain line 82.

As may be seen in FIG. 3, when the transmission is shifted into neutral by moving of the selector valve 71 to this position, both forward and reverse clutch lines 83 and 84 are connected to the drain line 82.

In addition to pressurizing the clutch pistons 52 and 83, as already noted, the pump 66 also delivers lubricant to the various components of the transmission. Specifically, the input shaft 32 may be drilled with further passages to supply lubricant to the forward drive gear 45 and the reverse drive gear 46 which will lubricant not only these gears by also the driven bevel gear 47.

The outer housing assembly 26 of the outboard drive portion 21 as has been noted is made up of a number of pieces. One of these main pieces is formed with a pair of oppositely facing bored openings sized adequately so as to permit insertion of the transmission assembly 45 through the opposite sides along with the input shaft 32. For example, the input shaft 32 may be inserted through the forward end of the housing through the forward most opening Z and then the multiple discs clutches 48 and driving bevel gear 45, which have a smaller diameter than the opening Z, can be insert therethrough. The clutches of the clutch assembly 49 and the driving bevel gear 46 are inserted through the rear face. The front face is then closed by a closure plug that carries the bearing 33 and the rear face is closed by the control assembly 56 which carries the thrust bearing 34. As a result, the construction can be very easily assembled.

Also, unlike prior art type of constructions, the diameters of the driving bevel gears 45 and 46 is less than the diameter of the driven bevel gear 47. This permits a lower overall height but along elongates the area between the driving bevel gears 45 and 46 and permits the use of a greater number clutch plates for the clutches 48 and 49 and, accordingly, higher torque transmitting capabilities without increasing the overall size of the assembly.

In FIGS. 3 and 4, the transmission selector valve 71 has been depicted as a reciprocated spool type valve. However, in actual practice this valve is a rotary plug type valve.

Referring now to FIGS. 5 through 9, the housing 26 is provided with a bore 86 in which a complimentary cylindrical portion 87 of a valve member, indicated generally by the reference numeral 88 is positioned. The supply conduit 76 communicates with the bore 86. The valve member 88 also has a stem portion 93 to which an actuating lever 94 is affixed in an appropriate manner for rotating the valve member 71.

Figure 7:
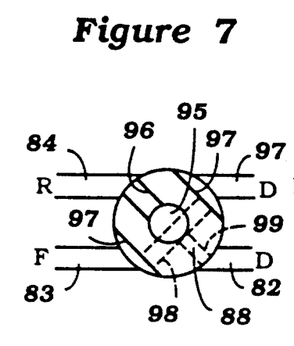
FIGS. 7, 8 and 9 are cross sectional views taken along the line 7—7 of FIG. 5 and show the valve in the forward, neutral and reverse modes.

A centrally bored supply passage 95 extends through the portion 87 of the valve member 88 and terminates in a radially extending supply passage 96 which is adapted to selectively communicate with either the forward clutch supply port 83 (FIG. 9) or the reverse clutch supply port 84 (FIG. 7).

Figure 8:
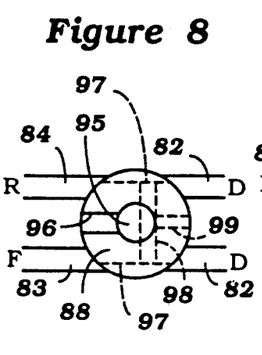

In the neutral position, FIG. 8, the supply passage 96 does not communicate with either of the clutch ports 83 and 84. In the neutral position, reliefs 97 formed on opposite sides of the valve portion 87 communicate the clutch ports 83 and 84 with the drain ports 82.

Figure 9:
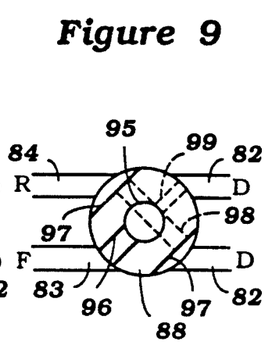

A cross passage 98 is formed by a steel tube inserted in a drilled passageway communicates the reverse clutch port 84 with the drain 82 in the forward drive position (FIG. 7) and the forward clutch port 83 with the drain port 82 in the reverse drive position (FIG. 9).

In addition to the supply port 96, the central valve member portion 87 is provided with a pair of smaller diameter cross drilled, axially spaced reactive ports 99 which extend at 180° from the supply port 96. The ports 99 are disposed so that they will not register with the either the clutch ports 83 and 84 or the drain ports 85 regardless of the position of the valve member 88. As a result, fluid pressure that is applied through the supply port 96 will be balanced by the fluid pressure acting through the reaction ports 99 so as to insure against any unbalanced radial forces acting on the valve member 88 which would resist its rotation.

There is provided a detent ball 101 that is acted on by a coil spring 102 and cooperates with a plurality of detent recesses 103 for holding the valve member 88 in its forward, neutral and reverse positions.

Returning again to FIG. 2, a clutch actuator housing 104 is affixed over the hydraulic pump 66 and selector valve 71 and encloses the hydraulic mechanism as afore described. It should also be readily apparent that the forward drive gear 45 and forward clutches 48 may be removed through an opening in the forward portion of the housing assembly 26 for servicing. In a like manner, the hydraulic control assembly 56, reverse drive gear 46 and reverse clutch 49 may be removed and serviced by removing a removable cover plate 105 of the housing assembly 26.

As has been noted, the clutch release springs 54 and 55 in addition to acting to return the clutch actuating pistons 52 and 53 to their retracted positions also operate against the bevel gears 45 and 46. This action of the springs 54 and 55 on the gears 45 and 46 maintains the gears 45 is a fixed position when the unit is assembled so as to insure against changes in lash between the driving bevel gears 45 and 46 and the driven bevel gear 47. This construction may be best understood by reference to FIGS. 10 and 11.

The spring 54 engages a thrust washer 106 that is held axially on the drive shaft 32 before the clutch assembly is inserted into the housing of the outer unit 26 by means of a snap ring 107 (FIG. 11). However, when installed as shown in FIG. 10, the thrust washer 106 will engage a anti-friction thrust needle bearing 108 that is engaged with the interface of the forward driving gear 45 and will urge the opposite side of the forward driving gear 45 into engagement with a corresponding needle bearing 109 that transmit the thrust to the interrace of the thrust bearing 33. When this occurs, a gap G will open between the thrust washer 106 and the snap ring 107.

A similar relationship exist with the reverse gear 46 in that the spring 55 normally engages a thrust washer 111 which is held axially on the drive shaft 32 by means of a snap ring 112. The thrust washer 111 will engage the snap ring 112 before the reverse driving gear 46 is inserted into the outer housing assembly. When the gear 46 is inserted, however, and the thrust bearing 34 is put in position a needle bearing 113 will engage the rear face of the reverse drive gear 46 and urge a further needle bearing 114 against the thrust washer 111 so as to open a gap G between the thrust washer 111 and the snap ring 114.

As a result of the aforedescribed construction, the springs 54 and 55 maintain a pressure on the thrust bearings 33 and 34 through the driving bevel gears 45 and 46 that will hold these gears in position. Hence, even when a drive is not being transmitted through the gears 45 and 46 they can not rattle or move along the drive shaft 32 and the constant lash will be maintained between the gears 45 and 46 and the driven bevel gear 47. When the clutches are engaged by actuation of either the pistons 52 or 53, the return springs 54 and 55 will be compressed and this compression will add to the force against the bevel gears 45 and 46 holding them in engagement with the respective thrust bearings 33 and 34.

It should be readily apparent from the aforedescribed construction that the arrangement insures a constant lash in the bevel gear train regardless of whether or not the associated clutches are engaged so that undo wear of the transmission and noise will be prevented. In addition, a very simple assembly method is possible through the use of the snap rings on the drive shaft that holds the thrust washers from displacement during the assembly process.

It should be readily apparent that the foregoing description is that of a preferred embodiment of the invention and that various changes and modifications may be made without departing from the spirit and scope and of the invention, as defined by the appended claims.

I claim:

1. In a bevel gear transmission for transmitting drive between a first shaft rotatable about a first axis and a second shaft rotatable about a second axis, a first bevel gear on said first shaft, a second bevel gear enmeshed with said first bevel gear and on said second shaft, said first bevel gear being movable axially relative to said first shaft, a thrust bearing engaged with one side of said first bevel gear, and a coil compression spring having wound coils extending around an axis and defining opposite ends adapted to be loaded in compression for providing an expansion force along said axis, said coil encircling said first shaft so that said spring axis is coaxial with said first shaft, one end of said spring being operatively engaged with the other side of said first bevel gear for urging said one side of said first bevel gear axially into engagement with said thrust bearing under the expansion forces of said coil spring.

2. In a bevel gear transmission as set forth in claim 1 wherein the coil compression spring engages a thrust washer that is engaged with the other side of the first bevel gear and further including a retainer ring fixed to said first shaft for limiting the degree of movement of said thrust washer under the action of said coil compression spring.

3. In a bevel gear transmission as set forth in claim 2 wherein the retainer ring is disposed for holding the thrust washer and the coil compression spring on the first shaft during assembly of the first shaft into the first bevel gear and wherein the thrust washer is urged away from the retainer ring when the first shaft is fully inserted into the first bevel gear.

4. In a bevel gear transmission as set forth in claim 1 further including clutch means for selectively coupling said first gear for rotation with said first shaft.

5. A bevel gear transmission for transmitting drive between a first shaft rotatable about a first axis and a second shaft rotatable about a second axis, a first bevel gear on said first shaft, a second bevel gear enmeshed with said first bevel gear and on said second shaft, said first bevel gear being axially movable relative to said first shaft, a thrust bearing engaged with one side of said first bevel gear, a coil compression spring operatively engaged with the other side of said first bevel gear for urging said one side of said first bevel gear into engagement with said thrust bearing, and clutch means for selectively coupling said first bevel gear for rotation with said first shaft, said clutch means including a hydraulic actuating piston for actuating said clutch means.

6. In a bevel gear transmission as set forth in claim 5 wherein the coil compression spring further acts to release the clutch actuating piston when hydraulic pressure is not applied.

7. In a bevel gear transmission as set forth in claim 6 wherein the coil compression spring encircles the first shaft.

8. In a bevel gear transmission as set forth in claim 7 wherein the coil compression spring engages a thrust washer that is engaged with the other side of the first bevel gear and further including a retainer ring fixed to said first shaft for limiting the degree of movement of said thrust washer under the action of said coil spring.

9. In a bevel gear transmission as set forth in claim 8 wherein the retainer ring is disposed for holding the thrust washer and the coil compression spring on the first shaft during assembly of the first shaft into the first bevel gear and wherein the thrust washer is urged away from the retainer ring when the first shaft is fully inserted into the first bevel gear.

10. In a bevel transmission as set forth in claim 1 wherein the bevel gear transmission is a reversing transmission and further including a third bevel gear rotatably journaled on the first shaft and enmeshed with the second bevel gear on the opposite side from the first bevel gear, a second thrust bearing engaged with one side of said third bevel gear and a second coil compression spring engaged with the other side of said third bevel gear for urging said one side of said third bevel gear into engagement with said second thrust bearing.

11. In a bevel gear transmission as set forth in claim 10 wherein each of the coil compression springs engages a thrust washer that is engaged with the other side of the respective bevel gear and further including retainer rings fixed to said thrust washers under the action of said coil compression springs.

12. In a bevel gear transmission as set forth in claim 11 wherein retainer rings are disposed for holding the thrust washers and the coil compression springs on the first shaft during assembly of the first shaft into the first bevel gear and wherein the thrust washer is urged away from the retainer ring when the first shaft is fully inserted into the first bevel gear.

13. In a bevel gear transmission as set forth in claim 10 further including first and second clutch means for selectively coupling said first and said third gears for rotation with said first shaft.

14. In a bevel gear transmission for transmitting a reversing drive between a first shaft rotatable about a first axis and a second shaft rotatable about a second axis, a first bevel gear on said first shaft, a second bevel gear enmeshed with said first bevel gear and on said second shaft, a third bevel gear rotatably journalled on said first shaft and enmeshed with said second bevel gear on a diametrically opposite side from said first bevel gear, said first and said third bevel gears being axially movable relative to said first shaft, a first thrust bearing engaged with one side of said first bevel gear, a second thrust bearing engaged with one side of said second bevel gear, first spring means operatively engaged with the other side of said first bevel gear for urging said one side of said first bevel gear into engagement with said first thrust bearing, second spring means operatively engaged with the other side of said third bevel gear for urging said one side of said third bevel gear into engagement with said second thrust bearing, first and second clutch means for selectively coupling said first and said third level gears for rotation with said first shaft, said clutch means including a pair of hydraulic actuating pistons for actuating the respective clutch means.

15. In a bevel gear transmission as set forth in claim 14 wherein the coil compression springs further act to release the respective clutch hydraulic actuating piston when hydraulic pressure is not applied.

16. In a bevel gear transmission as set forth in claim 15 wherein the coil compression springs each encircling the first shaft.

17. In a bevel gear transmission as set forth in claim 16 wherein the each coil spring engages a thrust washer that is engaged with the other side of the respective bevel gear and further including a retainer ring fixed to said first shaft for limiting the degree of movement of said thrust washers under the action of said springs.

18. In a bevel gear transmission as set forth in claim 17 wherein each retainer ring is disposed for holding the respective thrust washer and the coil spring on the first shaft during assembly of the first shaft into the first bevel gear and wherein the thrust washer associated with the first bevel gear is urged away from the retainer ring when the first shaft is fully inserted into the first bevel gear.

* * * * *